United States Patent Office 3,565,941
Patented Feb. 23, 1971

3,565,941
PROCESS FOR THE SELECTIVE ALKYLATION OF POLYALKYLENE POLYAMINES
Clarence R. Dick, James Larry Potter, and William P. Coker, Lake Jackson, Tex., assignors to The Dow Chemical Company, Midland, Mich., a corporation of Delaware
No Drawing. Filed July 31, 1968, Ser. No. 748,950
Int. Cl. C07c 85/00, 85/02, 89/00
U.S. Cl. 260—465.5                         6 Claims

ABSTRACT OF THE DISCLOSURE

In the process of alkylating a polyalkylene polyamine, it is found that by first reacting the polyamine with an acid the primary amino groups are effectively blocked from alkylation and therefore selective alkylation at the secondary amino groups is obtained in the reaction between an alkylating agent and the polyalkylene polyamine salt. The alkylated polyamines are useful as chemical intermediates, monomers, bases and flocculating agents.

BACKGROUND OF THE INVENTION

Previous methods for polyethylene polyamines alkylation have been reported at (1) N. H. Agnew and J. R. Parrish, J. Chem. Soc. (London), Sec. C, 203–8 (1966) and (2) U.S. Pat. 3,051,751 issued to W. W. Levis, Jr., E. A. Weipert and H. Rubeinstein.

The Agnew et al. reference teaches the allylation of ethylenediamine (EDA) and diethylenetriamine (DETA) in the reaction between an allyl halide and either EDA or DETA. The reaction product was generally a mixture of isomers with varying degrees of allylation. Selective allylation at the secondary amino groups was obtained in the above reaction by reacting the allyl halide with the polyamine in the presence of acetone, which functioned both as a solvent and as a reactant.

The Levis et al. patent teaches the production of 4-(2-hydroxypropyl) DETA in the reaction sequence wherein DETA and 2-p-dioxanone first react to form an amide which is further reacted with propylene oxide to produce the alkylated polyamine. Hydrolysis of the amide yields the free polyamine product. In this reaction, the primary amines were blocked from the reaction with propylene oxide by first reacting with dioxanone.

SUMMARY OF THE INVENTION

A new process has now been discovered whereby polyalkylene polyamine compounds containing a combination of secondary and primary amino nitrogen atoms can be selectively alkylated at the secondary amino groups.

In the inventive alkylation process, the primary amine groups in a polyalkylene polyamine are tightly complexed with an acid, and are blocked from alkylation, and the secondary amino groups are left substantially free to react with an alkylating agent.

The new process comprises reacting an acid with the polyalkylene polyamine to make a soluble amine salt, and then reacting a solution of said salt with an alkylating reagent to produce the alkylated polyamine salt. The alkylated polyamine salt can be readily hydrolyzed to the free amine.

The five most important variables in this alkylation process are (1) alkylating reagents, (2) polyalkylene polyamines, (3) acids, (4) equivalents of acid per equivalent of primary amino groups, and (5) equivalents of alkylating reagent per equivalent of secondary amino groups to be alkylated.

ALKYLATING REAGENTS

The alkylating agents known by those skilled in the art to alkylate polyalkylene polyamines and alkylene amines are effective in the inventive process and typical such alkylating agents are disclosed below.

Three-membered ring systems containing nitrogen or oxygen are reactive. Such reagents include alkylenimines (aziridines) and the alkylene oxides.

The aziridines may be substituted or unsubstituted as per the general formula:

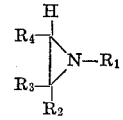

wherein $R_1$ is hydrogen; alkyl, amino- or hydroxy-substituted alkyl of 1–25 carbon atoms; alkenyl, aralkyl, amino- or hydroxy-substituted alkenyl or aralkyl of 2–25 carbon atoms, $R_2$, $R_3$ and $R_4$ are hydrogen or alkyl groups of 1–10 carbon atoms or hydroxyalkyl groups of 2–10 carbon atoms and at least one of $R_2$, $R_3$ and $R_4$ must be hydrogen. Examples include compounds such as N-(2-hydroxyethyl)aziridine, 2,2-dimethylaziridine, 2-methylaziridine, 2,3-dimethylaziridine, aziridine (ethylenimine), N-n-butylaziridine, and the like. Preferred aziridinyl alkylating reagents are aziridine and 2-methylaziridine.

The epoxides suitably contain 2–6 carbon atoms and react similarly to the aziridines above. Examples of such are ethylene oxide, propylene oxide, butylene oxide and the like.

Other alkylating reagents include primary alkyl and alkenyl halides, i.e. a compound containing a halomethyl group, with the bromides and the chlorides being the preferred species, such as methyl bromide, ethyl bromide, n-propyl chloride, isopropyl bromide and chloride, n-butyl bromide and chloride, sec-butyl bromide and chloride, allyl bromide and chloride, benzyl bromide and chloride. The alkyl and alkenyl halides may carry inert substituents, such as —OH, phenyl, alkoxy etc. and still be suitably reactive in the inventive process so long as the substituent is not attached to the same carbon as the reactive halide, e.g. 2-hydroxyethyl chloride, 4-ethylbenzyl bromide and the like.

Activated double bond systems of the general formula $CH_2=CRR'$, wherein R is cyano, carboxy or carboxamide and R' is hydrogen or methyl, and the dialkyl sulfates and alkyl sulfonates are likewise suitable alkylating reagents in the inventive process. Examples of such reagents include acrylic acid, acrylonitrile, acrylamide, methacrylic acid, methyl benzenesulfonate, dimethyl sulfate, diethyl sulfate, and the like.

Polyamines

Suitable polyamines in this process have a combination of primary and secondary amino groups and may also contain tertiary amino nitrogens, the preferred combination being primary and secondary amino groups. Examples of said polyamine compounds include (1) linear and branched polyalkylene polyamines of the general formula

wherein y is an integer of 1–1300 or more, the upper limit being bounded only by the solubility limit of the polyamine salt, x is the integer 1 or 2, R is hydrogen or alkyl of 1–2 carbon atoms and $R_1$ is hydrogen or

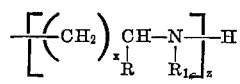

wherein z is 0-200 or more, such as diethylenetriamine, triethylenetetramine and so on to polyethylenimine and polypropylenimine of molecular weights up to 80,000 and above. Further suitable polyamine compounds have the general formula

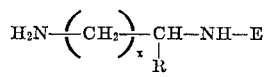

wherein $x$ is the integer 1 or 2, R is hydrogen or alkyl of 1-2 carbon atoms and E is

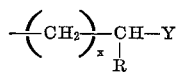

wherein $x$ and R have the aforesaid meaning and Y is the amino or hydroxy group. Examples of such include N-2-hydroxypropylethylenediamine, N - 2 - hydroxyethylethylenediamine, N-2-aminopropylpropylenediamine, N-2-hydroxyethylpropylenediamine, and other like compounds.

ACIDS

Any acid that forms a soluble amine salt with the polyamine is suitable. Typically, said acids are the strong acids such as $H_2SO_4$, HCl, HBr, $HClO_4$, $H_3PO_4$, p-toluenesulfonic and benzenesulfonic acids or trifluoroacetic acid. Preferred acids are $H_2SO_4$, and HCl, with $H_2SO_4$ being the most preferred.

RATIO OF ACID TO POLYAMINE

The soluble amine salt formed by the addition of an acid to the polyamine has the primary amine nitrogens complexed with the acid, and the secondary amino groups are left substantially free to react with the alkylating reagent. Accordingly, at least about one equivalent of acid per primary amino group should be used. Suitably, about 0.75-1.8 equivalents of acid are added per primary amino group in the polyamine, and preferably 1.05-1.55 equivalents per such group. Maximum yields of secondary amino alkylated product are obtained when operating within the preferred ratio. When operating outside this ratio, a decrease in yield may be observed.

RATIO OF POLYAMINE TO ALKYLATING REAGENT

For every equivalent of alkylating reagent one should use enough polyamine to provide at least one, and preferably 3-6, equivalents of secondary amino groups. Accordingly, a suitable range is 1-8 equivalents of secondary amino groups per equivalent of alkylating reagent and the preferred range is 3-6 equivalents.

Generally, suitable reaction solvents are polar solvents, e.g., water, lower alkanols and mixtures of such solvents. The preferred solvents are water, methyl alcohol, ethyl alcohol or mixtures of these solvents.

GENERAL PROCEDURE

Add a polyamine, which contains at least one secondary amino group and at least one primary and/or tertiary amino group, to a dilute acid with stirring to produce a solution of the soluble polyamine salt. Gradually add an alkylating reagent to the above amine salt solution with stirring. After this addition is complete, adjust the reaction temperature to a moderate temperature, such as 30 to 70° C., and maintain said reaction conditions a sufficient time to convert substantial amounts of the secondary amino nitrogen atoms into the corresponding alkylated tertiary nitrogen atoms.

Addition of a strong base to the above reaction mixture or to the isolated solid salt produces the free amine which is easily isolated and purified.

SPECIFIC EMBODIMENT

The following examples further illustrate the invention. Percentages are by weight unless otherwise specified.

Example 1.—Tris-(2-aminoethyl) amine $H_2SO_4$ (3.9 equivalents) was mixed with sufficient water to give a solution concentration of about 35.5%. Diethylenetriamine, hereinafter DETA (1.5 moles), was added to the dilute acid with stirring to make the solution concentration about 50%. Aziridine (0.5 mole), alternatively named ethylenimine, was added to this solution with stirring over approximately a one-hour period. The reaction mixture was heated at about 50° C. for 6 hours. The addition of excess 50% NaOH to the reaction mixture produced the free amine, which was purified by distillation. The tris-(2-aminoethyl) amine was obtained in about 90% of the theoretical yield, based on aziridine, with the remainder being mostly the straight-chain isomer, triethylenetetramine. Excess DETA was recovered by distillation.

In a separate repeat experiment, the alkylated polyamine salt, which was a solid, was isolated and washed with water. After treatment with caustic, the thus freed polyamine mixture was found to be at least 98% by weight tris-(2-aminoethyl) amine.

Example 2.—4-(2-aminopropyl) diethylenetriamine

Using the same reactants and procedure as in Example 1 except that the aziridine was replaced with 2-methylaziridine, a product was obtained that was about 78% 4-(2-aminopropyl) diethylenetriamine and about 22% 2-(methyl) triethylenetetramine.

Example 3.—4-(2-amino-2-methylpropyl) diethylenetriamine

Using the same reactants and procedure described in Example 1, except that the aziridine was replaced with 2,2-dimethylaziridine, a product was obtained that was about 55% 4-(2-amino-2-methylpropyl) diethylenetriamine and about 45% 2,2-(dimethyl) triethylenetetramine.

Example 4.—Allylation of polyethylenimine

Following the above examples, 50 g. of polyethylenimine (mol wt. about 20,000) was added to dilute $H_2SO_4$, 0.278 equivalent, to make an amine salt solution of about 50% concentration. Allyl chloride, 0.112 mole, was then added dropwise with stirring during a one-hour period. The reaction mixture was then heated at about 50° C. for 24 hours to insure complete reaction. Addition of 50% NaOH neutralized the acid and solid NaOH was then added to salt out the amine products. The amines were extracted with pyridine and analyzed by infrared analysis for the ratio of secondary/primary amino nitrogen. The ratio for the starting polyethylenimine was 2/1. The ratio for the alkylated product was 1.85/1, which represents a 15% reduction in secondary amino nitrogens and corresponds to an 80% allyl chloride conversion to the secondary alkylation. See the following table:

ALLYLATION OF POLYETHYLENIMINE

| Alkylating reagent | Moles of alkylating reagent | Equivalents $H_2SO_4$ | Ratio [1] |
|---|---|---|---|
| None | None | None | 2/1 |
| Allyl chloride | 0.112 | do | 2/1 |
| Do | 0.112 | 0.278 | 1.85/1 |

[1] The indicated ratio is the ratio of secondary/primary amino nitrogen. The >NH stretching bands at 3,300 cm.$^{-1}$ corrected for —NH$_2$ interference, and the —NH$_2$ stretching band at 3,370 cm.$^{-1}$ were used to determine these ratios.

Example 5.—5-(2-aminoethyl) dipropylenetriamine

Dipropylenetriamine (1.5 moles) was added to a dilute solution of $H_2SO_4$ (3.9 equivalents) to make a 50% amine salt solution. One-half mole of aziridine was then added over a one-hour period with stirring. The reaction mixture was then heated at about 50° C. for six hours. After treatment with base and purification by distillation, a product was obtained that was about 65% 5-(2-aminoethyl) dipropylenetriamine and about 35% 1-(2-aminoethyl) dipropylenetriamine.

A number of experiments were run in substantially the same manner as described in the general procedure and illustrated in the examples using aziridine as the alkylating reagent on diethylenetriamine (DETA) and the results are tabulated in Table I. Runs 20 and 21 used N-ethylaziridine and N-(2-hydroxyethyl) aziridine, respectively, instead of aziridine as the alkylating reagent. The figures in the "percent yield" column represent the yield of the branched tetramine based on 100% conversion of the alkylating reagent.

The percent yield of branched product was decreased when the percent solids in the reaction mixture was increased above about 60%. Above about 60%, the amine salt was no longer soluble and therefore was not available for alkylation.

TABLE I

| Run | Acid | Equivalents acid/primary amino group | Moles DETA/ moles aziridine | Percent solids based on DETA and acid | Percent yield |
|---|---|---|---|---|---|
| 1 | HCl | 1.60 | 1.0 | 23.6 | 29.9 |
| 2 | HCl | 1.50 | 1.0 | 45.4 | 29.0 |
| 3 | HCl | 1.80 | 3.0 | 50.0 | 11.2 |
| 4 | HCl | 1.70 | 3.0 | 50.0 | 15.4 |
| 5 | HCl | 1.60 | 3.0 | 50.0 | 27.0 |
| 6 | HCl | 1.50 | 3.0 | 50.0 | 43.0 |
| 7 | HCl | 1.40 | 3.0 | 50.0 | 43.2 |
| 8 | HCl | 1.30 | 3.0 | 50.0 | 63.2 |
| 9 | HCl | 1.30 | 3.0 | 50.0 | 45.8 |
| 10 | HCl | 1.10 | 3.0 | 50.0 | 37.6 |
| 11 | HCl | 1.00 | 3.0 | 50.0 | 24.4 |
| 12 | HCl | 1.30 | 3.0 | 70.0 | 45.8 |
| 13 | HCl | 1.30 | 3.0 | 80.0 | 46.0 |
| 14 | $H_2SO_4$ | 1.30 | 3.0 | 50.0 | 91.0 |
| 15 | $H_2SO_4$ | 1.25 | 3.0 | 56.0 | 75.6 |
| 16 | $H_2SO_4$ | 1.20 | 3.0 | 56.0 | 75.8 |
| 17 | $H_2SO_4$ | 1.15 | 3.0 | 56.0 | 67.4 |
| 18 | $H_2SO_4$ | 1.10 | 3.0 | 56.0 | 47.8 |
| 19 | $H_2SO_4$ | 1.05 | 3.0 | 56.0 | 36.0 |
| 20 | $H_2SO_4$ | 1.30 | 3.0 | 50.0 | 58.8 |
| 21 | $H_2SO_4$ | 1.30 | 3.0 | 50.0 | 56.1 |

The data in Table II were obtained by using various alkylating reagents on diethylenetriamine; the acid was sulfuric acid in all cases. Run 1 utilized dipropylenetriamine instead of DETA as the polyamine. The alkylated products were analyzed to determine the respective percentages of branched isomer, produced by alkylation of the secondary amino group, and linear isomer, produced by alkylation of a primary amino group.

We claim:
1. The process for selectively alkylating a secondary amino group of a polyalkylene polyamine having the general formula

or

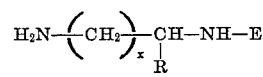

wherein $y$ is an integer of from 1 to 1,300, $x$ is the integer 1 or 2, R is hydrogen, methyl or ethyl, and $R_1$ is hydrogen or

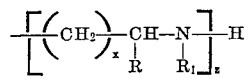

wherein $z$ is an integer of from 0 to 200, R and $R_1$ have the aforesaid meaning, and E is

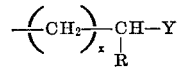

wherein $x$ and R have the aforesaid meaning and Y is a primary amino group or hydroxy, and the molecular weight of said polyalkylene polyamine is from 103 to about 80,000, said process comprising reacting by contacting, in an inert solvent, an acid with said polyalkylene polyamine in a ratio of from 0.75 to 1.8 equivalents of acid per primary amino group in said polyalkylene polyamine to form a soluble polyamine salt; and further reacting said salt, in solution, with an alkylating reagent in a ratio such that from 1 to 8 equivalents of secondary amino groups are present per mole of alkylating reagent.

2. The process defined in claim 1 wherein the alkylating agent is aziridine, 2-methylaziridine, 2,2-dimethylaziridine, N-ethylaziridine, N - 2 - hydroxyethylaziridine, ethylene oxide, propylene oxide, acrylonitrile, allyl chloride, benzyl chloride or dimethyl sulfate.

3. The process defined in claim 1 wherein the acid is $H_2SO_4$, HCl, HBr, $H_3PO_4$, p-toluenesulfonic acid, benzenesulfonic acid or trifluoroacetic acid.

TABLE II

| Run No. | Alkylating reagent | Mole ratio polyamine/ alkylating reagent | Equivalents sulfuric acid/primary amino group | Product composition, percent | |
|---|---|---|---|---|---|
| | | | | Branched isomer | Linear isomer |
| 1 | Aziridine | 3 | 1.30 | 65 | 35 |
| 2 | 2-methylaziridine | 3 | 1.30 | 79 | 22 |
| 3 | 2,2-dimethylaziridine | 3 | 1.30 | 55 | 45 |
| 4 | Propylene oxide | 3 | 1.30 | 78 | 22 |
| 5 | do | 3 | 1.05 | 94 | 6 |
| 6 | do | 3 | 0 | 19 | 81 |
| 7 | Acrylonitrile | 3 | 1.30 | 47 | 53 |
| 8 | do | 3 | 1.05 | 36 | 64 |
| 9 | do | 3 | 0 | 7 | 93 |
| 10 | Allyl chloride | 6 | 1.30 | 85 | 15 |
| 11 | do | 6 | 1.05 | 85 | 15 |
| 12 | do | 6 | 0 | 25 | 75 |
| 13 | Benzyl chloride | 6 | 1.30 | 93 | 7 |
| 14 | Dimethyl sulfate | 6 | 1.30 | 72 | 28 |
| 15 | do | 6 | 1.05 | 72 | 28 |
| 16 | do | 6 | 0 | 25 | 75 |

4. The process defined in claim 3 wherein 1.05–1.55 equivalents of acid are added per primary amino group in the polyamine.

5. The process defined in claim 3 wherein the acid is $H_2SO_4$ or HCl and wherein the polyamine is diethylenetriamine or polyethylenimine of molecular weight less than about 50,000 and wherein the alkylating reagent is aziridine, 2-methylaziridine, 2,2-dimethylaziridine, N-ethylaziridine, N-(2-hydroxyethyl) aziridine, ethylene oxide, propylene oxide, acrylonitrile, allyl chloride, benzyl chloride or dimethyl sulfate.

6. The process defined in claim 5 wherein the reaction temperature is from 30° C. to 70° C.

References Cited

UNITED STATES PATENTS 3,051,751  8/1962  Levis et al. _____ 260—583(I)X

OTHER REFERENCES

Agnew, Journal Chemical Society (London), Sec. C (1966) pp. 203–208.

CHARLES B. PARKER, Primary Examiner

R. L. RAYMOND, Assistant Examiner

U.S. Cl. X.R.

260—570.5, 583, 584